(12) United States Patent
Pal

(10) Patent No.: US 12,039,315 B2
(45) Date of Patent: Jul. 16, 2024

(54) SYSTEMS AND METHODS FOR UPDATING TELEVISION RECEIVING DEVICES

(71) Applicant: DISH Network L.L.C., Englewood, CO (US)

(72) Inventor: Rajiv Singh Cullen Pal, Denver, CO (US)

(73) Assignee: DISH Network L.L.C, Englewood, CO (US)

( * ) Notice: Subject to any disclaimer, the term of this patent is extended or adjusted under 35 U.S.C. 154(b) by 282 days.

(21) Appl. No.: 16/510,687

(22) Filed: Jul. 12, 2019

(65) Prior Publication Data
US 2021/0011702 A1  Jan. 14, 2021

(51) Int. Cl.
| | |
|---|---|
| H04N 21/258 | (2011.01) |
| G06F 8/65 | (2018.01) |
| H04N 21/262 | (2011.01) |
| H04N 21/41 | (2011.01) |
| H04N 21/422 | (2011.01) |
| H04N 21/45 | (2011.01) |
| H04N 21/458 | (2011.01) |
| H04N 21/462 | (2011.01) |

(52) U.S. Cl.
CPC ......... *G06F 8/65* (2013.01); *H04N 21/26291* (2013.01); *H04N 21/4126* (2013.01); *H04N 21/4622* (2013.01)

(58) Field of Classification Search
None
See application file for complete search history.

(56) References Cited

U.S. PATENT DOCUMENTS

| | | | | |
|---|---|---|---|---|
| 7,634,296 | B2 * | 12/2009 | Haeusel | H04N 21/4334 725/62 |
| 2007/0130592 | A1 * | 6/2007 | Haeusel | G06F 1/1632 725/62 |
| 2014/0282712 | A1 * | 9/2014 | Unnikrishnan | H04N 21/4786 725/34 |
| 2015/0365280 | A1 * | 12/2015 | Lohrey | G08C 17/00 370/254 |
| 2017/0026110 | A1 * | 1/2017 | Richardson | H01Q 1/1257 |
| 2017/0208418 | A1 * | 7/2017 | Conan | H04W 4/50 |
| 2018/0310149 | A1 * | 10/2018 | Lee | H04W 4/50 |

\* cited by examiner

*Primary Examiner* — Brian T Pendleton
*Assistant Examiner* — Jean D Saint Cyr
(74) *Attorney, Agent, or Firm* — Jeremiah J. Baunach; Frontier IP Law PLLC

(57) ABSTRACT

Systems and methods for updating television receiving devices (such as cable and satellite set-top boxes) include functionality that pre-downloads software or firmware updates for the receiving device on a mobile device, such as a smartphone, of a television service provider technician. In order to communicate the updates to the receiving device from the mobile device, during initial installation of the set-top box at the customer premises, the technician connects his or her mobile device to the same input of the set-top box that normally receives the television programming and remote software or firmware updates from the television service provider. The mobile device may include or be coupled to an adapter that adapts a signal and hardware interface from an output interface of the mobile device to a signal and hardware interface compatible with the input interface of the set-top box.

8 Claims, 8 Drawing Sheets

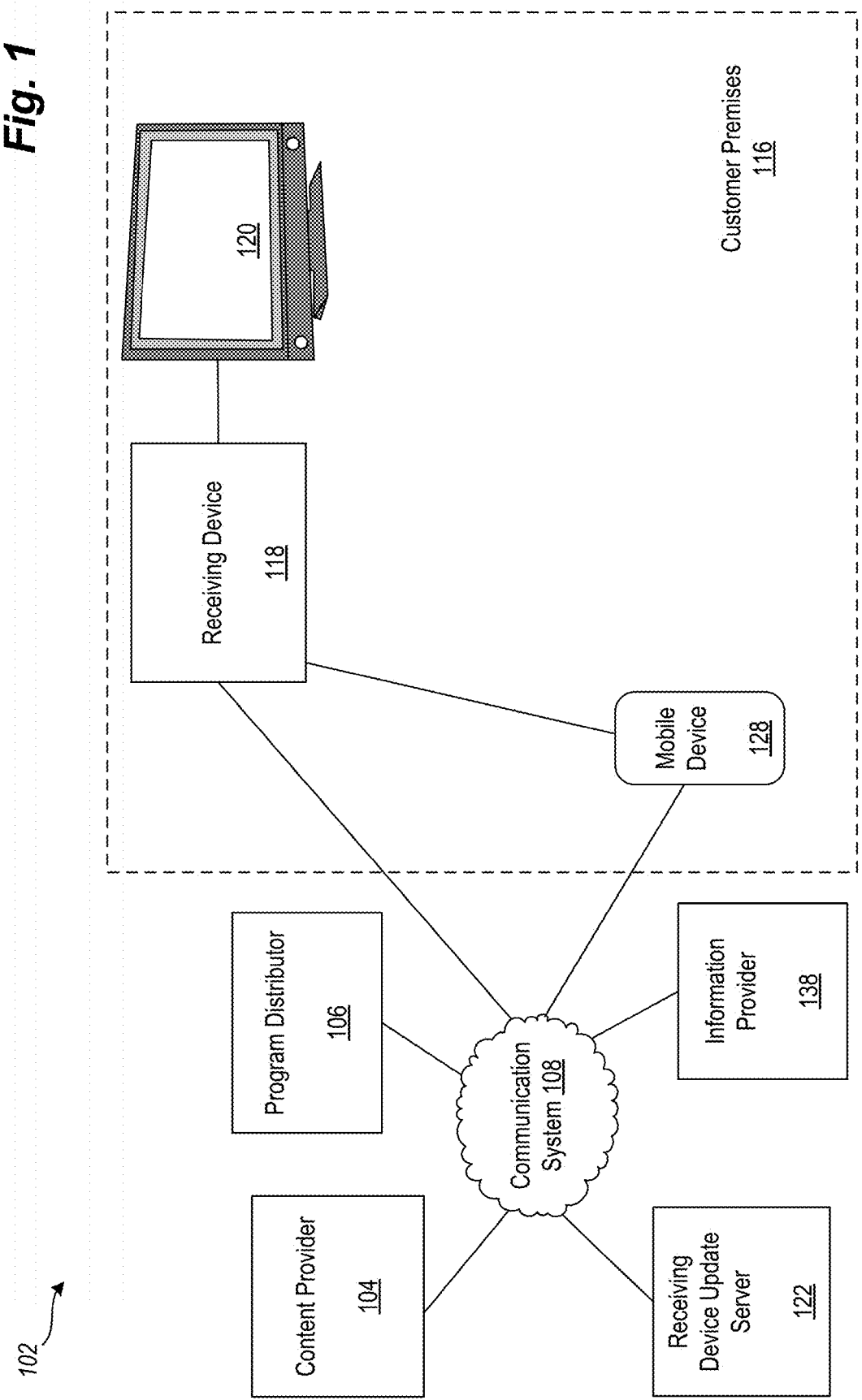

SYSTEMS AND METHODS FOR UPDATING TELEVISION RECEIVING DEVICES

TECHNICAL FIELD

The technical field relates to electronically updating television receiving devices, and particularly to electronically updating software or firmware of television receiving devices.

BRIEF SUMMARY

Software or firmware updates for television receiving devices may be pre-downloaded on a mobile device, such as a cellular smartphone, of a television service provider technician. Then, during initial installation of the set-top box at the customer premises, the technician may connect his or her mobile device to the same input of the set-top box that normally receives the television programming and remote software or firmware updates from the television service provider. The mobile device may include or be coupled to an adapter that adapts a signal and hardware interface from an output interface of the mobile device (e.g., a universal serial bus (USB) interface) to a signal and hardware interface compatible with the input interface of the set-top box that normally receives the television programming and remote software or firmware updates from the television service provider (e.g., a coaxial radio frequency (RF) interface). After such a connection is established, then the software or firmware updates pre-downloaded on the mobile device are communicated (e.g., via control from an application on the mobile device) to the set-top box more quickly than over the over the normal connection from the set-top box to the television service provider.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 1 is an overview block diagram illustrating a technical environment in which embodiments of updating television receiving devices may be implemented, according to an example embodiment.

DETAILED DESCRIPTION

Figure 2A:
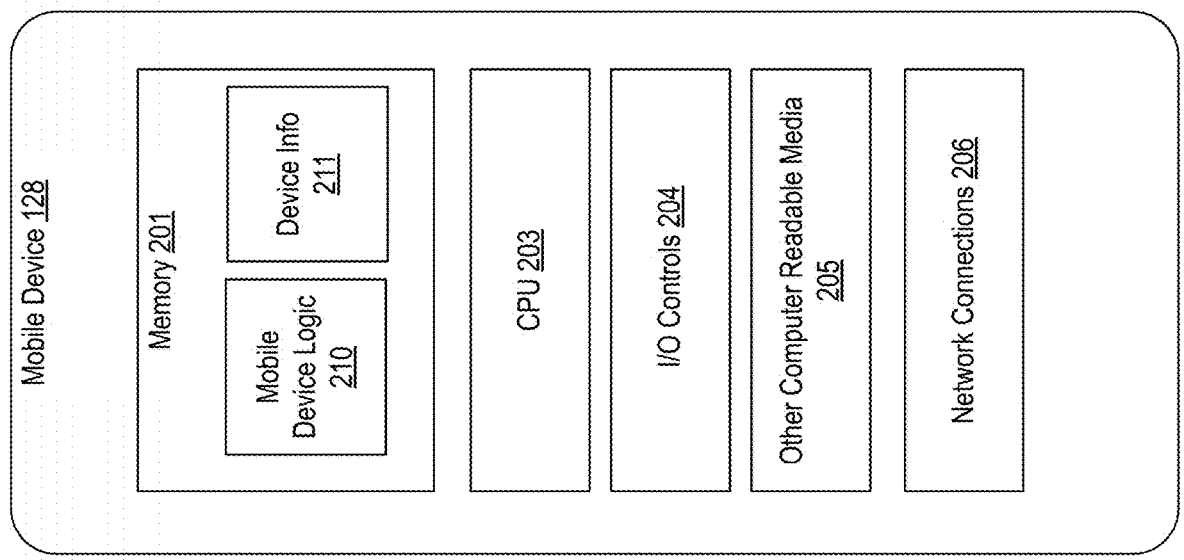
FIG. 2A is a block diagram illustrating elements of an example handheld mobile device used in updating television receiving devices, according to an example embodiment.

Initial installation of receiving devices, such as television service provider set-top boxes, for example, often involve lengthy downloads of software and/or firmware by the technician on site at the customer premises over a connection from the set-top box to the television service provider. This is often provided over the same satellite or cable connection that the set-top box has to the television service provider over which television programming is received by the set-top box. However, this connection often has limited bandwidth for administrative functions. In order to solve this technical problem, the software or firmware updates may be pre-downloaded on a mobile device of the technician, such as on a cellular smartphone. For example, such mobile devices may be issued to the technician by the satellite or cable television service provider. Then, during initial installation of the set-top box at the customer premises, the technician may connect his or her mobile device to the same input of the set-top box that normally receives the television programming and remote software or firmware updates from the television service provider. The mobile device may include or be coupled to an adapter that adapts a signal and hardware interface from an output interface of the mobile device (e.g., a USB interface) to a signal and hardware interface compatible with the input interface of the set-top box that normally receives the television programming and remote software or firmware updates from the television service provider (e.g., a coaxial radio frequency (RF) interface). After such a connection is established, then the software or firmware updates pre-downloaded on the mobile device are communicated (e.g., via control from an application on the mobile device) to the set-top box more quickly than over the normal connection from the set-top box to the television service provider.

FIG. 1 is an overview block diagram illustrating a technical environment in which embodiments of updating television receiving devices may be implemented, according to an example embodiment.

Before providing additional details regarding the operation and constitution of methods and systems for updating television receiving devices, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider outside the customer premises 116 and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108. Also, the receiving device 118 may be configured to receive, process and display on the presentation device 120 streaming media content received directly from the satellite or cable television service provider and/or other content provider 104.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider outside the customer premises and communicate that programming to another device over a network. Further, the receiving device 118 may itself include user interface devices, such as buttons or switches. In some example embodiments, the receiving device 118 may be configured to receive and decrypt content and/or software or firmware updates according to various digital rights management (DRM) and other access control technologies and architectures as part of or in addition to the process of updating television receiving devices, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In the example embodiment shown in FIG. 1, handheld mobile device 128 may be communicatively connected to the television receiving device 118 via a physical or a peer-to-peer short range wireless connection. For example, mobile device 128 may be a handheld mobile device of a user (e.g., a television service provider technician or customer), such as a smartphone, tablet device or other computing or communications device. There may be fewer or additional mobile devices in various embodiments. The mobile device 128 may communicate over communication system 108 with the television receiving device 118, program distributor 106, content provider 104, receiving device update server 122 and/or information provider 138 using the transmission control protocol/Internet protocol (TCP/IP) suite of networking communication protocols. In the present example, the cable or satellite television service provider may encompass or be in communication with some or all of the content provider 104, program distributor 106, receiving device update server 122, and information provider 138.

In particular, a content provider 104 provides program content, such as television content, to a distributor, such as the program distributor 106. Example program distributors include, but are not limited to, satellite and cable television service providers. Example content providers include television stations which provide local or national television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that is ultimately communicated to the receiving device 118. Various embodiments of the receiving device 118 may receive programming from program distributors 106 and/or directly from content providers 104 via locally broadcast radio, RF signals, cable, fiber optic, Internet media, or the like via the communication system 108.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at a content storage system of a content delivery network operably coupled to the communication system 108, under direct or indirect control of the program distributor 106, to the receiving device 118. Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or downloading to a receiving device 118 such as a computer, DVR (also called a personal video recorder) or portable media player for viewing at any time.

In some embodiments, the receiving device 118 may be a set-top box that is typically provided by the cable provider, satellite provider, or other program distributor 106 to which the customer may subscribe to receive such television services and that also receives programming through traditional channels using a terrestrial, satellite signal, and/or cable television format. The mobile device 128 in communication with the receiving device 118 may be provided by the program distributor, such as a cable provider or satellite provider. However, in some instances, such mobile devices may be devices other than those provided by the program distributor 106. For example, these may include various user devices such as a tablet device, game machine, smart phone, mobile device or other computing device or media player or communications device not provided by or controlled by the cable provider, satellite provider, or other program distributor to which the customer subscribes for the television services.

The receiving device update server 122 is operably coupled to the communication system 108 and may be a system of an entity that provides or initiates providing of data representing software and/or firmware updates to the receiving device 118. For example, such updates may include, but are not limited to, software and/or firmware related to: the receiving device operating system, electronic program guides (EPG), control programs, initialization routines, identification codes, serial numbers, part numbers, communication systems, authorization codes and/or procedures, applications, application programming interfaces (API), advertisements, interactive elements or features, system menus, user interfaces, software version control information, instruction manuals or data, manufacturer information, etc. Such data may be stored and/or accessible by the receiving device update server 122. In some embodiments, the receiving device update server 122 may be the same server that may also provide such updates to the receiving device 118 via the satellite or cable television service connection via communication system 108. Such updates to the receiving device 118 may be provided by the receiving device update server 122 via the same input of the receiving device 118 that receives the television programming from the television service provider (e.g., via the input on the receiving device 118 from the low-noise block downconverter (LNB) of a satellite dish connected to the receiving device 118). However, this connection often has limited bandwidth for such administrative functions. The environment 102 may include many systems associated with a television service provider, such as the program distributor 106, that operate in a manner such as the receiving device update server 122 described herein, and the receiving device update server 122 represents one or more of such systems in various embodiments.

In addition, information provider 138 may provide various forms of content and/or services to various devices residing in the customer premises 116. For example, information provider 138 may also or instead provide information to the receiving device 118 regarding software and/or firmware updates for the receiving device 118, other receiving devices of a particular television service provider, such as program distributor 106, and/or other additional content or metadata regarding a media content segment provided to the receiving device 118. In some embodiments, software and/or firmware updates or other additional content or metadata may be provided directly to the mobile device 128 via a wired or wireless connection to the mobile device 128. The information provider 138 may also, or instead, be another third party entity providing software and/or firmware updates, on behalf of the program distributor 106, the receiving device update server 122 or other authorized entity.

Encryption and decryption may be performed to secure the software and/or firmware updates communicated via communication system 108 and the mobile device 128 as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the environment 102, the customer premises 116, and the various devices therein, is intended as a broad, non-limiting overview of an example environment in which various embodiments of updating television receiving devices may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different receiving device update servers, content providers, program distributors and information providers that operate in a corresponding manner as the receiving device update server 122, the content provider 104, program distributor 106 and information provider 138 as described herein. Each of receiving device update server 122, the content provider 104, program distributor 106 and information provider 138 may represent one or more of such systems in various embodiments.

Example embodiments described herein provide applications, tools, data structures and other support to implement updating of television receiving devices. Other embodiments of the described techniques may be used for other purposes, including updating television receiving devices not only during initial installation, but during subsequent service calls to the customer premises 116. Also, such software and/or firmware updates may be performed on various other devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

FIG. 2A is a block diagram illustrating elements of an example handheld mobile device 128 used in updating television receiving devices, according to an example embodiment.

In one example embodiment, mobile device 128 may be a wireless handheld mobile device of a user (e.g., a television service provider technician or customer), such as a smartphone, tablet device or other mobile computing or communications device. In one embodiment, mobile device 128 comprises a computer memory ("memory") 201 and one or more Central Processing Units ("CPU") 203. Also included are input/output "I/O" controls 204, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, trackballs and/or joysticks, etc. The mobile device 128 may also include other computer-readable media 205 (e.g., flash memory, SIM card) and network connections 206. The I/O controls 204 may include various different numbers and configurations of controls in various embodiments, including those with touch screen buttons and other input controls.

The network connections 206 include one or more communication interfaces to various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The one or more Central Processing Units ("CPU") 203 may be communicatively coupled to the memory 201 and the I/O controls 204, other computer-readable media 205 and network connections 206, (e.g., via a communications bus) in a manner to control one or more operations of those various components.

The mobile device 128 may communicate with receiving device 118 (directly or via communication system 108), the receiving device update server 122, content provider 104, program distributor 106, and/or information provider 138, and possibly other devices (not shown). Mobile device logic 210 and device information 211 is shown residing in memory 201. In other embodiments, some portion of the device information 211 and some of, or all of, the components of the logic 210 may be stored on the other computer-readable media 205. For example, the software and/or firmware updates received from the receiving device update server 122 may be stored on memory 201 and/or other computer-readable media 205. The logic 210 preferably executes on one or more CPUs 203 and manages operation of the mobile device 128 to perform the techniques described herein. The logic 210 may comprise or implement a system control module as executed by one or more CPUs 203 that are communicatively coupled to the I/O controls 204 and other components of the mobile device 128. Other code or programs and potentially other data/information (not shown), may also reside in the memory 201, and may execute on one or more CPUs 203. Of note, one or more of the components in FIG. 2 may not be present in any specific implementation. For example, some embodiments may not provide other computer readable media 205.

The logic 210 performs the core functions of the mobile device 128, as discussed herein and also with respect to FIGS. 1 and 2B through 7. In particular, the logic 210 reads input that results from activation of I/O controls 204 on the mobile device 128 by the user and performs the function corresponding to the input, including communicating software and/or firmware updates to the receiving device 118, sending commands to various devices and performing internal operations of the mobile device 128. For example, the logic 210, when executed on one or more CPUs 203, may perform or cause the following to be performed: receiving data representing one or more of software and firmware updates for the receiving device 118 from the receiving device update server 122; establishing an electronic communication link between the mobile device 128 located at a customer premises 116 and the receiving device 118 located at the customer premises 116; and electronically communicating, from the mobile device 128 at the customer premises 116, software and/or firmware updates for the receiving device 118 directly to the receiving device 118.

Figure 2B:
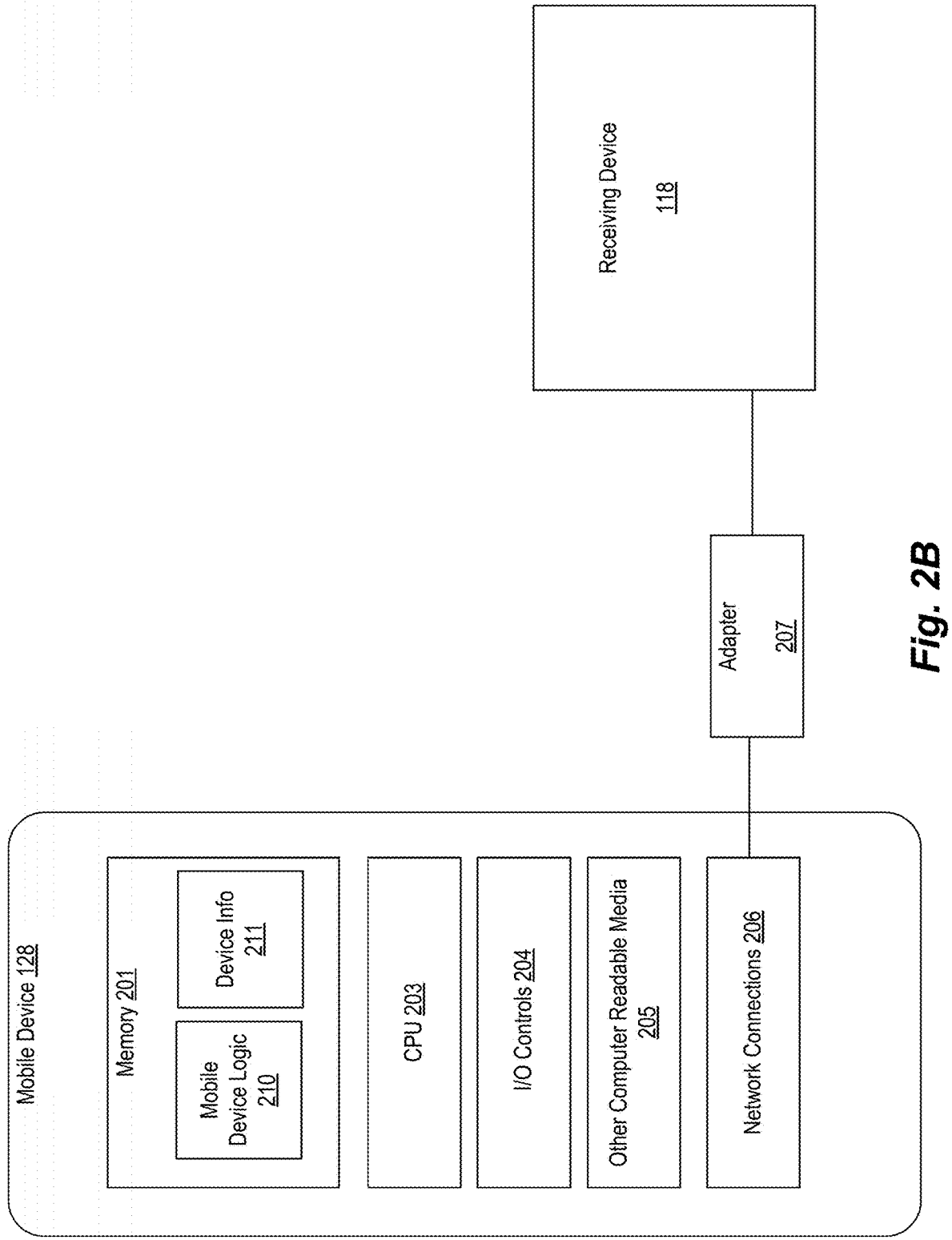
FIG. 2B is a block diagram illustrating an example connection between the handheld mobile device of FIG. 2A and a receiving device that may be updated using the handheld mobile device, according to an example embodiment.

The mobile device 128 may simulate for the receiving device 118, via the interface of the receiving device for receiving television programming, the software and/or firmware update being from the receiving device update server 122 of the cable or satellite television service provider. For example, this simulating may be performed by communicating the software and/or firmware updates in the same format, at the same input interface of the receiving device 118 and using the same communication protocol as that used by the receiving device 118 to receive the software and/or firmware updates from the receiving device update server 122. This simulation causes the television receiving device to be updated without any modifications to the receiving device 118 and more quickly than waiting to download the updates from the receiving device update server 122. In some embodiments, the mobile device 128 may include or be coupled to an adapter (as shown in FIG. 2B) in order to adapt a signal and hardware interface from an output interface of the mobile device (e.g., a USB interface) to a signal and hardware interface compatible with the input interface of the set-top box that normally receives the television programming and remote software or firmware updates from the television service provider (e.g., a coaxial RF interface).

Also, the logic 210 may gather information about the receiving device 118, such as to use such information to select the corresponding software/and or firmware update stored on the memory 201 of the mobile device 128 for the particular receiving device. For example, the information about the receiving device 118 may include, but is not limited to, a database of identifiers of various devices, device part numbers, device model numbers, device serial numbers, device software and/or firmware version numbers, device codes, wireless protocols used by various devices, identifiers of various corresponding modes, device commands, programmed macros, learned device commands, other commands corresponding to those devices. The information about the receiving device 118 may also include user preference data, user profile data, user credential or identity data and/or other user-related data. In this manner, various user profiles may be stored or otherwise accessed that prevent or allow pairing with or communication with the mobile device or receiving device 118, based on a particular user identified as using the mobile device 128 or receiving device 118 or being logged in a system that includes the mobile device 128 or receiving device 118. In some embodiments, the user may be identified by password entry, fingerprint reader or other biometric data sensor or reader included in the I/O controls of the mobile device 128.

In at least some embodiments, remote and/or programmatic access is provided to at least some of the functionality of the mobile device 128. For example, the mobile device 128 may provide to other devices an application program interface ("API") that provides access to various functions of the mobile device 128, including access to information stored by the mobile device 128 (e.g., about other media devices) and software and/or firmware updates. In this manner, the API may facilitate the development of third-party software, such as user interfaces, plug-ins, adapters and the like, such as for integrating functions of the mobile device 128 into various user interface applications on media devices and various desktop or mobile device applications. For example, a particular mobile device application may present a graphical display showing an indication of the status of the receiving device 118, the version of the software or firmware on the receiving device and whether it has been updated. In some embodiments, a particular mobile device application may present a customized or different user interface based upon the functionality and capabilities of the mobile device 128 and/or the receiving device 118.

In an example embodiment, the logic 210 is implemented using standard programming techniques. For example, the logic 210 may be implemented as a "native" executable running on the CPU 203, along with one or more static or dynamic libraries. In other embodiments, the logic 210 may be implemented as instructions processed by a virtual machine that executes as some other program. In general, a range of programming languages known in the art may be employed for implementing such example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use well-known or synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the mobile device 128.

In addition, programming interfaces to the data stored as part of the device information 211, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The device information 211 (which may include mobile device information, data representing receiving device software and/or firmware updates and receiving device information) may be implemented as one or more database systems, file systems, or any other technique for storing such information, or any combination of the above, including, in some embodiments, implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the mobile device 128.

Furthermore, in some embodiments, some or all of the components/portions of the logic 210 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

FIG. 2B is a block diagram illustrating an example connection between the handheld mobile device 128 of FIG. 2A and the receiving device 118 that may be updated using the handheld mobile device, according to an example embodiment.

An adapter 207 is shown that is configured to adapt a signal from an output interface of the handheld mobile device 128 to a signal compatible with an input interface, of the receiving device 118, which is configured to receive television programming from a television service provider, such as program distributor 106. For example, the input interface of the receiving device 118 may be an input configured to receive output from the satellite dish or cable head end of the television service provider such as program distributor 106, via communication system 108. Such an input to the receiving device 118 may include, for example, a coaxial RF input port into which coaxial RF cable from a satellite dish LNB is connected. The television service provider technician may connect the mobile device 128 to this input port via adapter 207, which adapts a signal and hardware interface from the output interface of the mobile device (e.g., a USB-C or USB micro interface) to a signal and hardware interface compatible with the coaxial RF cable input interface of the receiving device 118. In such embodiments, the adapter 207 may physically connect to both the mobile device 128 and receiving device 118. Other signal and physical formats and communication protocols may be used in various embodiments, depending on the particular receiving device and mobile device functionality and capabilities.

In other embodiments, the adapter 207 may include a wireless interface (a peer-to-peer short range wireless interface), such that it is physically connected to the receiving device 118, but wirelessly connected to the mobile device 128. In such embodiments a peer-to-peer short range wireless connection (e.g., Bluetooth® connection) is made between the network connections 206 of the mobile device 128 and the adapter 207 that is physically connected to the input interface of the receiving device 118. In such an embodiment, the software and/or firmware updates are wirelessly communicated from the mobile device 128 to the adapter 207. The adapter then adapts the signal to the compatible format and applies it to the input interface of the receiving device 118 to which the adapter is connected. In some embodiments, the receiving device 118 may have short range wireless communication functionality and the connection between the mobile device 128 and the receiving device 118 may be a wireless connection that does not include adapter 207, and that bypasses the physical cable input interface of the receiving device 118.

Figure 3:
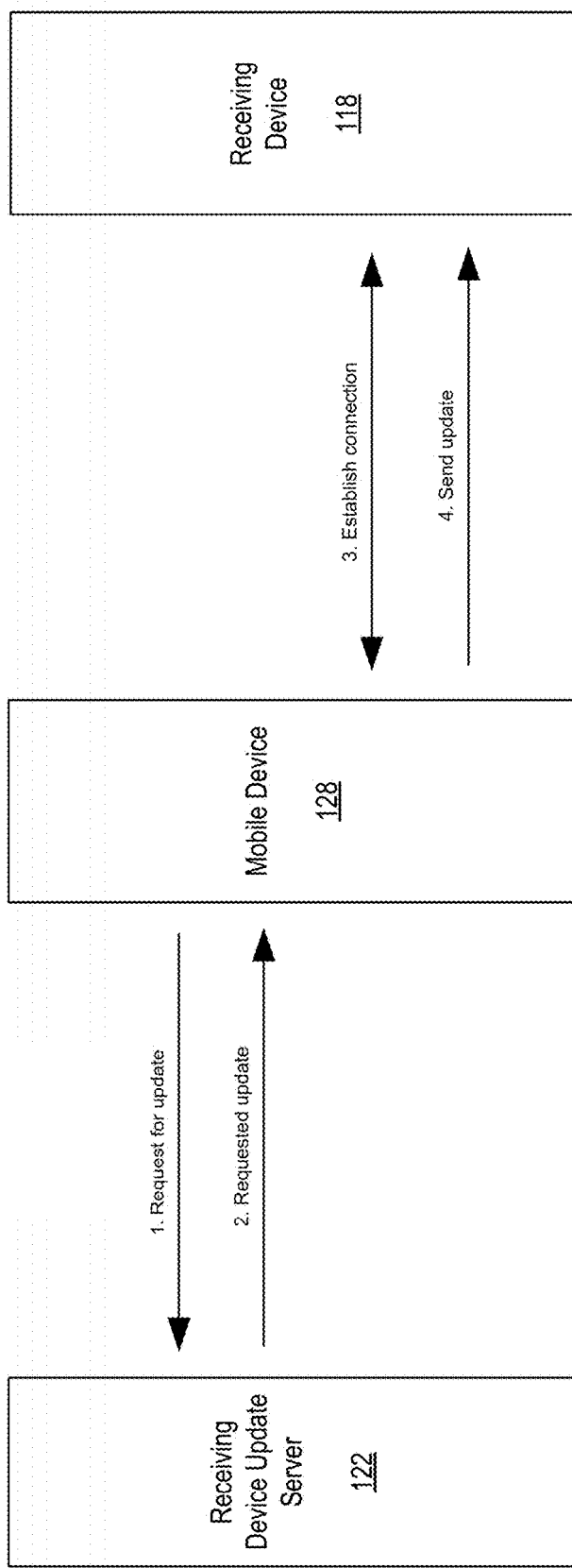
FIG. 3 is a diagram illustrating an example sequence of operations in updating television receiving devices, according to an example embodiment.

FIG. 3 is a diagram illustrating an example sequence of operations in updating television receiving devices, according to an example embodiment.

In an example embodiment, the mobile device 128 communicates a request for receiving device software and/or firmware updates over communication system 108 to the receiving device update server 122. This request may be made in advance of the initial installation of the receiving device 118 or service call at the customer premises 116. For example, a service call or installation notice received by the mobile device 128 may automatically trigger the request for receiving device software and/or firmware updates to be made. In other embodiments, receiving device software and/or firmware updates may be automatically requested on a periodic basis, pushed from the receiving device update server 122 to the mobile device 128 on a periodic basis, and/or pushed from the receiving device update server 122 to the mobile device 128 upon a new version of receiving device software or firmware becoming available. An application running on the mobile device (e.g., provided by the television service provider) may store such updates on the mobile device 128 and control operation of communication of such updates from the mobile device 128 to various receiving devices as applicable when a service call is made to a customer premises at which a corresponding receiving device is located. In response to the request being sent to the receiving device update server 122, the receiving device update server 122 electronically communicates the requested software and/or firmware updates to the mobile device 128. The mobile device 128 then establishes an electronic communication link, via the network connections 206 of the mobile device 128, between the mobile device 128 and the receiving device 118 located at the customer premises 116. The mobile device 128 then electronically communicates, via the network connections 206 of the mobile device 128, the requested software and/or firmware updates for the receiving device 118 directly to the receiving device 118 located at the customer premises.

Figure 4:
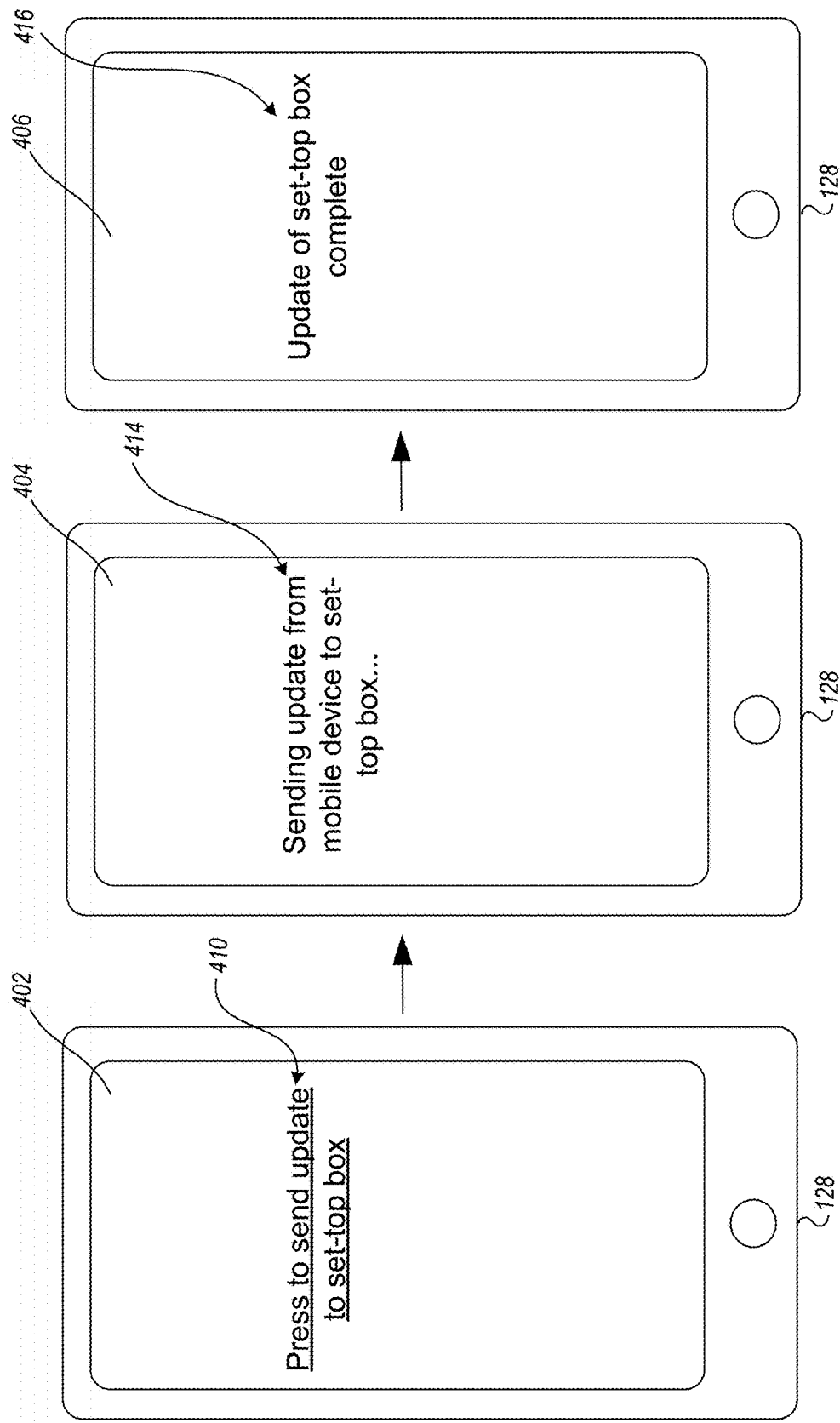
FIG. 4 is a diagram of an example handheld mobile device illustrating three example user interface screens shown in an example receiving device update process, according to an example embodiment.

FIG. 4 is a diagram of the example mobile device 128 illustrating three example user interface screens 402, 404 and 406 shown in an example receiving device update process, according to an example embodiment.

After the mobile device 128 receives the requested software and/or firmware updates from the receiving device update server 122, the user of the mobile device 128 may start (if not already running) an application on the mobile device 128 that controls and manages communication of the updates from the mobile device 128 to the receiving device 118. For example, the mobile device 128 may communicate with the receiving device 118 via network connections 206 first to check whether the receiving device 118 has already been updated with the latest version of the software and/or firmware available. If the receiving device 118 has not been updated with the latest version of the software and/or firmware available, the application on the mobile device 128 may cause a prompt 410 to be displayed on the user interface screen 402 that prompts the user to select the prompt (which may be a button, link or other interactive user interface element) in order to start the receiving device update process. In response to the user selecting the prompt 410, the mobile device 128 may start communicating to the receiving device 118 the latest version of the software and/or firmware that was received from the receiving device update server 122. While the mobile device 128 is communicating to the receiving device 118 the latest version of the software and/or firmware that was received from the receiving device update server 122, the mobile device 128 may present a status message 414 on user interface screen 404 regarding the status of the update being sent to the receiving device 118 (e.g., "Sending update from mobile device to set-top box . . . "). In response to the mobile device 128 having finished communicating to the receiving device 118 the latest version of the software and/or firmware, the mobile device 128 may present a message 416 on user interface screen 406 that the update of the receiving device 118 is complete. In some embodiments, the receiving device 118 may communicate to the mobile device 128 that the installation of the updates are complete and the mobile device 128 may instead wait to present the message 416 on user interface screen 406 until the installation of the updates are complete. Audile prompts and/or messages corresponding to prompt 410, message 414 and message 416 may instead or also be presented by the mobile device 128 in various embodiments.

Figure 5:
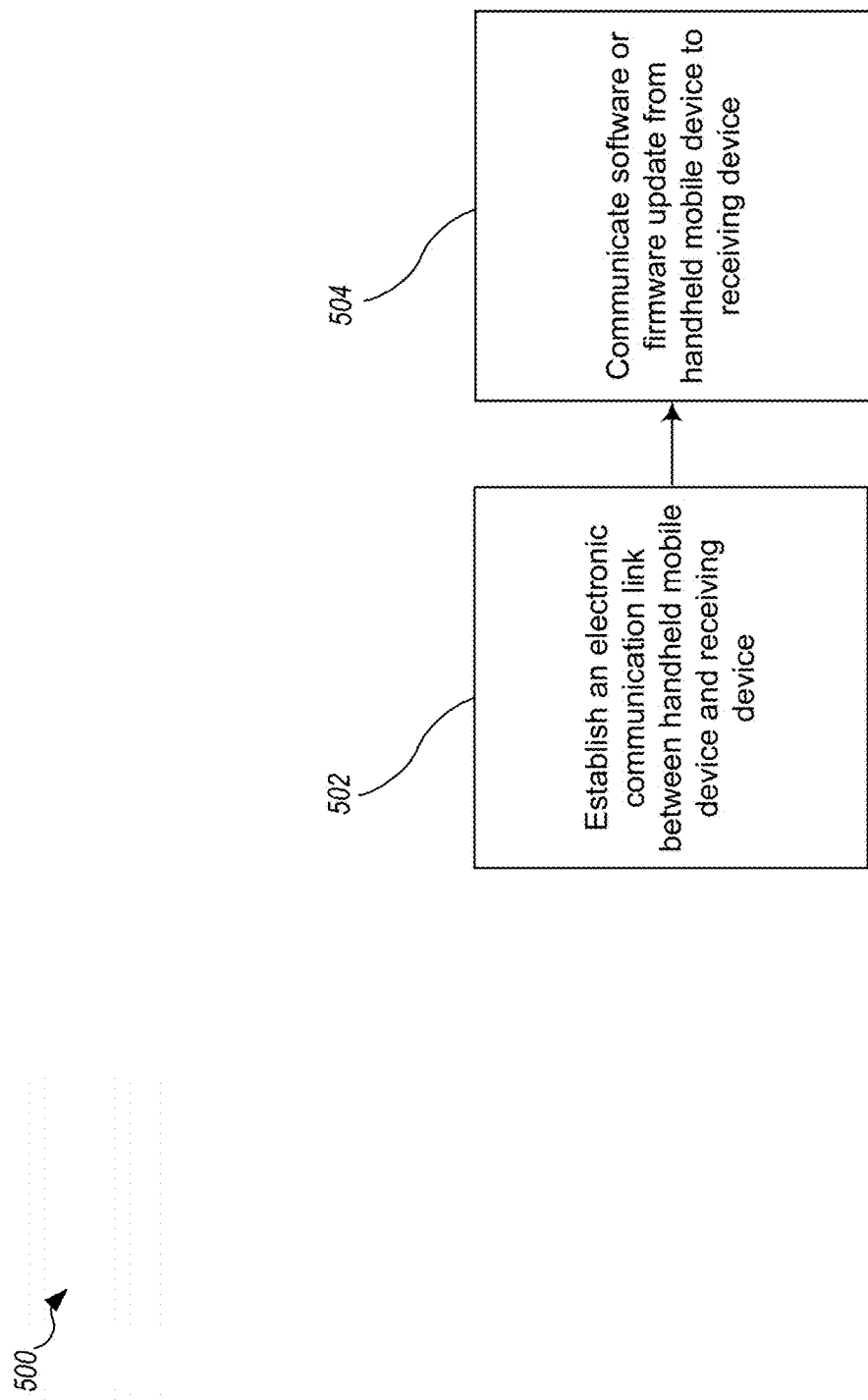
FIG. 5 is a flow diagram of a first example method for updating television receiving devices that may be performed from a perspective of a handheld mobile device, according to an example embodiment.

FIG. 5 is a flow diagram of a first example method 500 for updating television receiving devices that may be performed from a perspective of a mobile device 128, according to an example embodiment.

At 502, the handheld mobile device 128 establishes an electronic communication link between the handheld mobile device 128 located at the customer premises and a satellite or cable television receiving device located at the customer premises, such as receiving device 118.

At 504, the handheld mobile device 128 electronically communicates from the handheld mobile device located at the customer premises 116, one or more of a software and firmware update for the satellite or cable television receiving device located at the customer premises directly to the satellite or cable television receiving device located at the customer premises.

Figure 6:
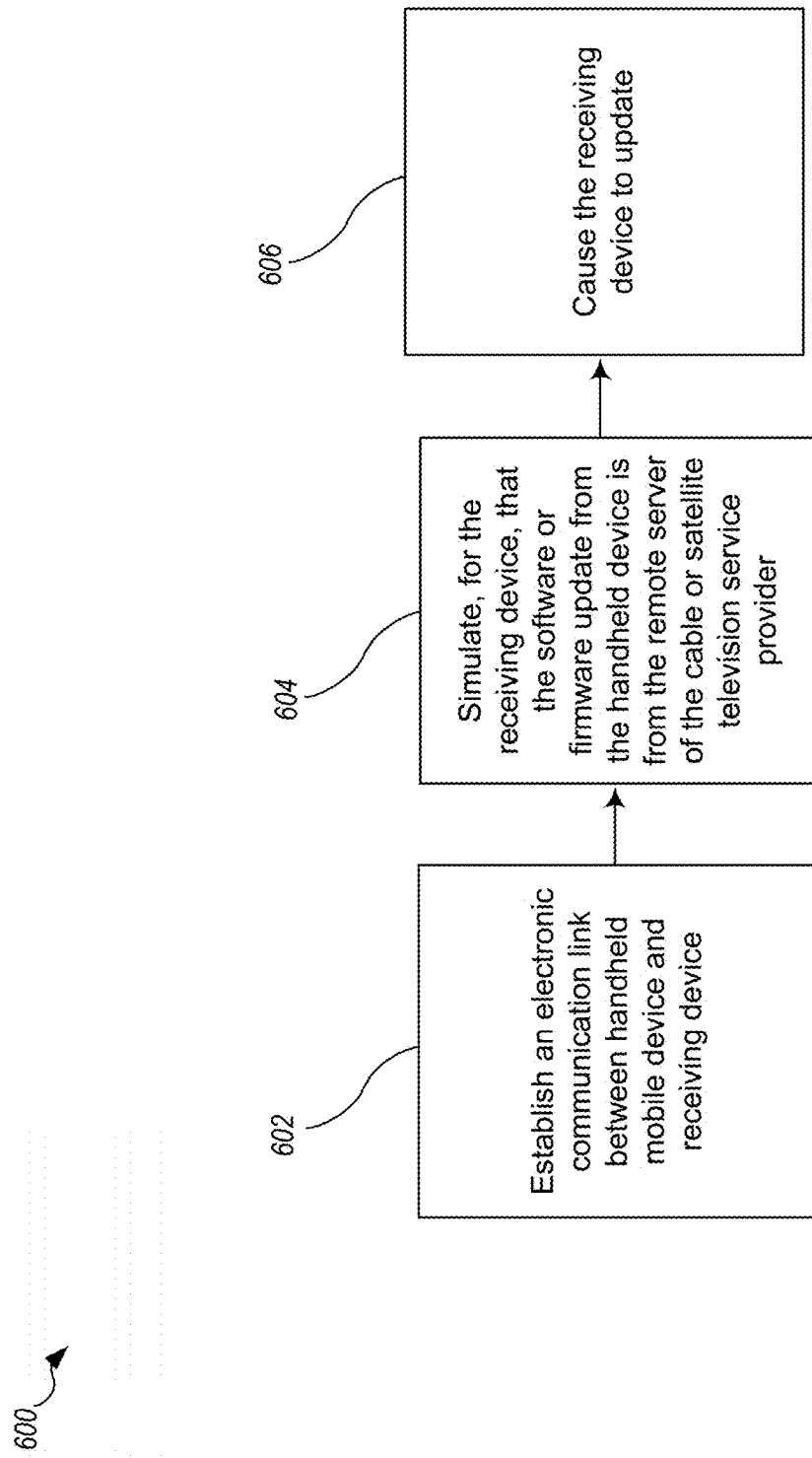
FIG. 6 is a flow diagram of a second example method for updating television receiving devices that may be performed from a perspective of a handheld mobile device, according to an example embodiment.

FIG. 6 is a flow diagram of a second example method 600 for updating television receiving devices that may be performed from a perspective of a mobile device, according to an example embodiment.

At 602, the handheld mobile device 128 establishes an electronic communication link between the handheld mobile device 128 located at the customer premises and a satellite or cable television receiving device located at the customer premises, such as receiving device 118.

At 604, the handheld mobile device 128 simulates, for the satellite or cable television receiving device, via the interface of the satellite or cable television receiving device for receiving television programming, that one or more of software and firmware updates is from the remote server of the cable or satellite television service provider for updating the satellite or cable television receiving device.

At 606, the handheld mobile device 128, as a result of the simulation, causes the satellite or cable television receiving device to be updated.

Figure 7:
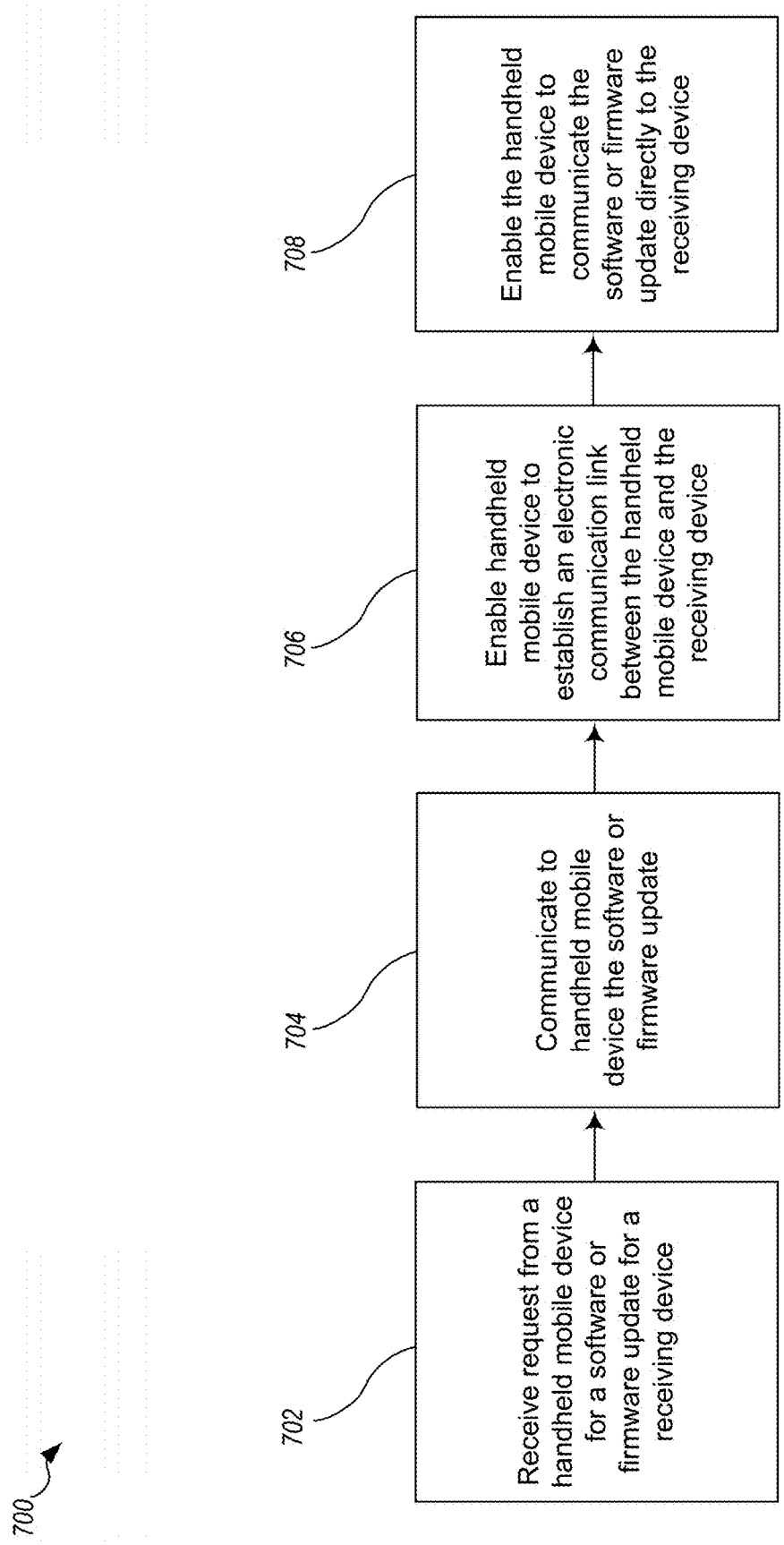
FIG. 7 is a flow diagram of an example method for updating television receiving devices that may be performed from a perspective of a receiving device update server, according to an example embodiment.

FIG. 7 is a flow diagram of an example method 700 for updating television receiving devices that may be performed from a perspective of a receiving device update server, such as receiving device update server 122, according to an example embodiment.

At 702, the receiving device update server 122 receives a request, from a handheld mobile device, such as mobile device 128, for one or more of a software and firmware update for a satellite or cable television receiving device located at a customer premises.

At 704, the receiving device update server 122, in response to the request, electronically communicates, from the receiving device update server 122 to the handheld mobile device, the one or more of a software and firmware update for the satellite or cable television receiving device located at a customer premises.

At 706, the receiving device update server 122 enables the handheld mobile device to establish an electronic communication link, via at least one electronic communications interface, between the handheld mobile device and the satellite or cable television receiving device located at the customer premises.

At 708, the receiving device update server 122 enables the handheld mobile device to electronically communicate, via the at least one electronic communications interface, from the handheld mobile device located at the customer premises, the one or more of the software and firmware update for the satellite or cable television receiving device located at the customer premises directly to the satellite or cable television receiving device located at the customer premises.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for updating satellite or cable television receiving set-top box devices, comprising:
    establishing an electronic communication link between a handheld mobile device located at a customer premises and a satellite or cable television receiving set-top box device located at the customer premises; and
    electronically communicating, from the handheld mobile device located at the customer premises, one or more of a software and firmware update including at least one control program for the satellite or cable television receiving set-top box device located at the customer premises directly to the satellite or cable television receiving set-top box device located at the customer premises, wherein:
    the electronic communication link between the handheld mobile device located at the customer premises and the satellite or cable television receiving set-top box device located at the customer premises simulates, for the satellite or cable television receiving set-top box device, a communication link between a remote server of a cable or satellite television service provider for updating the satellite or cable television receiving set-top box device and the satellite or cable television receiving set-top box device; and
    the satellite or cable television receiving set-top box device is configured to receive, via an interface of the satellite or cable television receiving set-top box device for receiving television programming, the one or more of the software and firmware update, and
    the electronically communicating, from the handheld mobile device located at the customer premises, the one or more of the software and firmware update to the satellite or cable television receiving set-top box device located at the customer premises includes electronically communicating the one or more of the software and firmware update to the satellite or cable television receiving set-top box device via an adapter adapting a signal from an output interface of the handheld mobile device to a signal compatible with an input interface, of the satellite or cable television receiving set-top box device, configured to receive television programming from a television service provider.

2. A method for updating satellite or cable television receiving set-top box devices, comprising:
    establishing an electronic communication link between a handheld mobile device located at a customer premises and a satellite or cable television receiving set-top box device located at the customer premises; and
    electronically communicating, from the handheld mobile device located at the customer premises, one or more of a software and firmware update including at least one control program for the satellite or cable television receiving set-top box device located at the customer premises directly to the satellite or cable television receiving set-top box device located at the customer premises, wherein:

the electronic communication link between the handheld mobile device located at the customer premises and the satellite or cable television receiving set-top box device located at the customer premises simulates, for the satellite or cable television receiving set-top box device, a communication link between a remote server of a cable or satellite television service provider for updating the satellite or cable television receiving set-top box device and the satellite or cable television receiving set-top box device;

the satellite or cable television receiving set-top box device is configured to receive, via an interface of the satellite or cable television receiving set-top box device for receiving television programming, the one or more of the software and firmware update; and the electronically communicating, from the handheld mobile device located at the customer premises, the one or more of the software and firmware update to the satellite or cable television receiving set-top box device located at the customer premises includes electronically communicating the one or more of the software and firmware update to the satellite or cable television receiving set-top box device via an adapter configured to adapt a physical format of an output interface of the handheld mobile device located at the customer premises to connect to an input interface of the satellite or cable television receiving set-top box device, configured to receive television programming from a television service provider.

3. A method for updating satellite or cable television receiving set-top box devices, comprising:

establishing an electronic communication link between a handheld mobile device located at a customer premises and a satellite or cable television receiving set-top box device located at the customer premises; and electronically communicating, from the handheld mobile device located at the customer premises, one or more of a software and firmware update including at least one control program for the satellite or cable television receiving set-top box device located at the customer premises directly to the satellite or cable television receiving set-top box device located at the customer premises, wherein:

the electronic communication link between the handheld mobile device located at the customer premises and the satellite or cable television receiving set-top box device located at the customer premises simulates, for the satellite or cable television receiving set-top box device, a communication link between a remote server of a cable or satellite television service provider for updating the satellite or cable television receiving set-top box device and the satellite or cable television receiving set-top box device;

the satellite or cable television receiving set-top box device is configured to receive, via an interface of the satellite or cable television receiving set-top box device for receiving television programming, the one or more of the software and firmware update; and the electronically communicating, from the handheld mobile device located at the customer premises, the one or more of the software and firmware update to the satellite or cable television receiving set-top box device located at the customer premises, includes electronically communicating the one or more of the software and firmware update to the satellite or cable television receiving set-top box device via a universal serial bus (USB) to coaxial radio frequency (RF) adapter having a USB interface connected to a USB output interface of the handheld mobile device and a coaxial RF connector connected to an input interface, of the satellite or cable television receiving set-top box device, configured to receive television programming from a television service provider.

4. The method of claim 1 further comprising:

before establishing the electronic communication link between the handheld mobile device located at a customer premises and a satellite or cable television receiving set-top box device located at the customer premises, receiving, by the handheld mobile device, data representing the one or more of the software and firmware update for the satellite or cable television receiving set-top box device.

5. The method of claim 4 wherein the receiving, by the handheld mobile device, data representing the one or more of the software and firmware update for the satellite or cable television receiving set-top box device occurs before the handheld mobile device is located at the customer premises.

6. The method of claim 5 wherein the receiving, by the handheld mobile device, data representing the one or more of the software and firmware update for the satellite or cable television receiving set-top box device includes receiving, by the handheld mobile device, data representing the one or more of the software and firmware update for the satellite or cable television receiving set-top box device from a remote server of a cable or satellite television service provider.

7. A system for updating satellite or cable television receiving set-top box devices, comprising:

at least one processor of a handheld mobile device;

at least one electronic communications interface coupled to the at least one processor; and at least one memory coupled to the at least one processor, wherein the at least one memory has computer executable instructions stored thereon which, when executed by the at least one processor, cause the at least one processor to:

cause the handheld mobile device to establish an electronic communication link, via the at least one electronic communications interface, between the handheld mobile device located at a customer premises and a satellite or cable television receiving set-top box device located at the customer premises; and electronically communicate, via the at least one electronic communications interface, from the handheld mobile device located at the customer premises, one or more of a software and firmware update including at least one control program for the satellite or cable television receiving set-top box device located at the customer premises directly to the satellite or cable television receiving set-top box device located at the customer premises, wherein the electronic communication link between the handheld mobile device located at the customer premises and the satellite or cable television receiving set-top box device located at the customer premises simulates, for the satellite or cable television receiving set-top box device, a communication link between a remote server of a cable or satellite television service provider for updating the satellite or cable television receiving set-top box device and the satellite or cable television receiving set-top box device and the electronically communicating, from the handheld mobile device located at the customer premises, the one or more of the software and firmware update to the satellite or cable television receiving set-top box device located at the customer premises, includes electronically communicating the one or more of the software and firmware update to the satellite or cable television receiving set-top box device via a universal serial bus (USB) to coaxial radio frequency (RF) adapter having a USB interface connected to a USB output interface of the handheld mobile device and a coaxial RF connector connected to an input interface, of the satellite or cable television receiving set-top box device, configured to receive television programming from a television service provider.

8. A non-transitory computer readable storage medium having computer executable instructions thereon that, when executed by at least one computer processor, cause the at least one computer processor to:

receive a request, from a handheld mobile device, for one or more of a software and firmware update for a satellite or cable television receiving set-top box device located at a customer premises;

in response to the request, electronically communicate, from a remote server of a cable or satellite television service provider to the handheld mobile device, the one or more of a software and firmware update for the satellite or cable television receiving set-top box device located at a customer premises;

enable the handheld mobile device to establish an electronic communication link, via at least one electronic communications interface, between the handheld mobile device and the satellite or cable television receiving set-top box device located at the customer premises;

enable the handheld mobile device to electronically communicate, via the at least one electronic communications interface, from the handheld mobile device located at the customer premises, the one or more of the software and firmware update including at least one control program for the satellite or cable television receiving set-top box device located at the customer premises directly to the satellite or cable television receiving set-top box device located at the customer premises; and cause the at least one computer processor to enable the at least one computer processor to receive, via an interface of the satellite or cable television receiving set-top box device for receiving television programming, the one or more of the software and firmware update from the handheld mobile device, wherein the electronically communicating, from the handheld mobile device located at the customer premises, the one or more of the software and firmware update including at least one control program for the satellite or cable television receiving set-top box device located at the customer premises includes electronically communicating the one or more of the software and firmware update to the satellite or cable television receiving set-top box device via an adapter adapting a signal from an output interface of the handheld mobile device to a signal compatible with an input interface, of the satellite or cable television receiving set-top box device, configured to receive television programming from a television service provider.

\* \* \* \* \*